United States Patent
Li

(10) Patent No.: US 8,091,457 B2
(45) Date of Patent: Jan. 10, 2012

(54) GUARD ASSEMBLY FOR A SAW BLADE

(75) Inventor: Jiangnan Li, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 11/788,944

(22) Filed: Apr. 23, 2007

(65) Prior Publication Data

US 2007/0245871 A1    Oct. 25, 2007

(30) Foreign Application Priority Data

Apr. 25, 2006    (CN) .................... 2006 2 0072901 U

(51) Int. Cl.
*B23D 47/00* (2006.01)
*B27B 9/00* (2006.01)
*B27B 9/04* (2006.01)
*B26D 1/14* (2006.01)

(52) U.S. Cl. ........................................... 83/478; 30/390

(58) Field of Classification Search .................. 83/478, 83/788, 58; 30/390, 391, 278, 276, 370, 30/382; 125/13.01
See application file for complete search history.

(56) References Cited

U.S. PATENT DOCUMENTS

| Number | | Date | Name | Ref |
|---|---|---|---|---|
| 344,292 A | * | 6/1886 | Touchette | 83/162 |
| 1,375,698 A | * | 4/1921 | Howe | 83/478 |
| 1,847,937 A | * | 3/1932 | Fetters | 16/339 |
| 2,412,120 A | * | 12/1946 | Bouchard | 351/141 |
| 2,562,396 A | * | 7/1951 | Schutz | 83/478 |
| 2,664,118 A | * | 12/1953 | Krumbach | 83/817 |
| 2,786,496 A | | 3/1957 | Eschenburg | |
| 2,797,433 A | * | 7/1957 | Hager, Jr. | 16/381 |
| 2,828,668 A | * | 4/1958 | De Angelis | 351/109 |
| 2,998,813 A | | 9/1961 | Wilson | |
| 3,128,661 A | * | 4/1964 | Diehl et al. | 83/860 |
| 4,055,160 A | | 10/1977 | Wilson | |
| 4,160,320 A | * | 7/1979 | Wikoff | 30/380 |
| 4,256,388 A | * | 3/1981 | Beyer | 351/158 |
| 4,597,178 A | * | 7/1986 | Dolata et al. | 30/138 |
| 4,685,364 A | * | 8/1987 | Scheflow et al. | 83/68 |
| 4,890,389 A | * | 1/1990 | Whitkop | 30/276 |
| 6,691,599 B2 | * | 2/2004 | Kao | 83/814 |
| 7,162,774 B1 | * | 1/2007 | Von Resch et al. | 16/236 |
| 7,506,407 B2 | * | 3/2009 | Ishiwata | 16/340 |
| 2004/0107816 A1 | * | 6/2004 | Lee | 83/788 |
| 2007/0044629 A1 | * | 3/2007 | Chung Lee | 83/788 |

* cited by examiner

*Primary Examiner* — Ghassem Alie
*Assistant Examiner* — Bharat C Patel
(74) *Attorney, Agent, or Firm* — McDermott Will & Emery LLP

(57) ABSTRACT

The present invention discloses a guard assembly for a saw blade, which includes an inner guard portion and an outer guard portion. The inner and outer guard portions define a containing space therebetween. A circular saw blade includes two parallel sides and a rotating axis perpendicular to the two sides. At least a portion of the saw blade is located within the containing space. The outer guard portion is pivotally connected with the inner guard portion about a pivotal axis which is substantially parallel to each side of the blade. The improved guard assembly, which can be opened laterally, is convenient to change the saw blade and to clean the inner of the guard.

2 Claims, 3 Drawing Sheets

GUARD ASSEMBLY FOR A SAW BLADE

CROSS-REFERENCE TO RELATED APPLICATIONS

This application claims priority to Chinese Application No. 200620072901.2 filed Apr. 25, 2006, the entire disclosure of which is incorporated herein by reference. Priority to this application is claimed under 35 U.S.C. 119, 120 and/or 365.

FEDERALLY SPONSORED RESEARCH OR DEVELOPMENT

Not Applicable.

TECHNICAL FIELD

The present invention relates to a guard assembly for a saw blade, and specially, it relates to a guard which can be opened laterally.

BACKGROUND OF THE INVENTION

During operation of a cutting machine with a high-speed rotating saw blade, to avoid the operator being hurt by the saw blade in the case of contacting it carelessly, typically a protective device, i.e. a guard, is arranged to cover at least a portion of the circumference of the saw blade.

A guard assembly is known includes an inner guard portion and an outer guard portion, which can be engaged to each other. Normally, at least a portion of the saw blade is received in a space formed by the two blade portions. The outer guard portion is pivotable relative to the inner one about an axis parallel to a rotating axis of the saw blade. When it is needed to replace the saw blade, a fixing device between the two guard portions is released, and then the outer guard portion can be rotated upwards to a predetermined angle relative to the inner guard portion to expose the fixing flange of the blade, and the blade can be removed and replaced subsequently. After a new blade is fixed, the outer guard portion can be pivoted back to the original position and fixed with the inner guard portion. Yet, in most cases the saw blade can't be completely exposed to facilitate blade changing, and it is inconvenient to clean the inner side of the guard assembly. Furthermore, the guard as aforementioned is not applicable in some cases. For example, when a protrudent laser device is disposed at the front of the inner guard portion, the outer guard portion will be stopped by the laser device from rotating further.

SUMMARY OF THE INVENTION

It is an object of the present invention to provide a guard assembly for a saw blade which can be opened laterally. The improved guard assembly is convenient for use and cleaning, as well as for being attached with some accessories.

To achieve such an object, the guard assembly of the present invention comprises an inner guard portion and an outer guard portion which define a containing space therebetween. A circular saw blade includes two parallel sides and a rotating axis perpendicular to the two sides. At least a portion of the saw blade is located within the containing space. The outer guard portion is pivotally connected with the inner guard portion about a pivot axis which is perpendicular to the rotating axis. The guard assembly further comprises a fixing device for fastening the outer guard portion to the inner guard portion.

The present invention provides a saw blade guard assembly with improved opening manner, i.e. the outer guard portion can be opened laterally relative to the inner guard portion. It overcomes the drawback that the outer guard portion can't be opened without limit to completely expose the blade according to the prior art. Moreover the improved guard is convenient to use and be cleaned.

BRIEF DESCRIPTION OF THE DRAWINGS

Advantages and novel features of the present invention will become apparent from the following detailed description of the preferred embodiment of the invention illustrated in the accompanying drawings, wherein.

DETAILED DESCRIPTION

Figure 1:
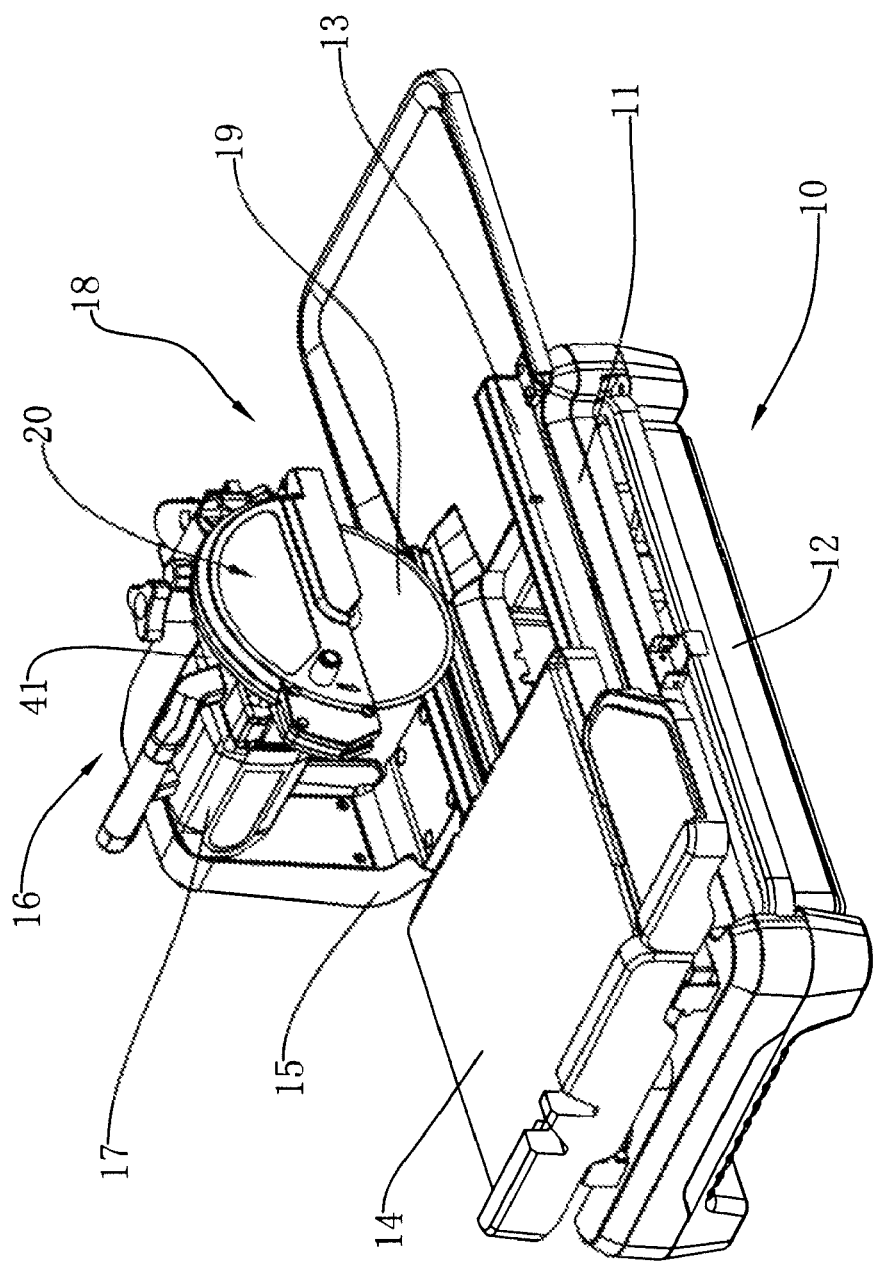
FIG. 1 is a perspective view of a tile cutter of the preferred embodiment according to the present invention.

FIG. 1 shows a tile cutter 10 of the preferred embodiment according to the present invention. The tile cutter 10 comprises a base 11, a water basin 12, a guide rail 13, a table 14, a supporting arm 15 and a cutting assembly 16. The water basin 12 is disposed below the base 11. The guide rail 13 is mounted on the base 11 for slidably supporting the table 14 thereon. The supporting arm 15 is fixed on the base 11 for supporting the cutting assembly 16. The cutting assembly 16 comprises a motor 17, a gear box 41 and a cutting unit 18. A portion of the gear box 41 is connected with the supporting arm 15. The gearbox 41 is connected with the motor 17 at one end, and is connected with the cutting unit 18 at the other end. The cutting unit 18 includes a saw blade 19 and a guard assembly 20. The saw blade 19, which is driven by the motor 17, is installed on an output shaft of the gear box 41.

Figure 2:
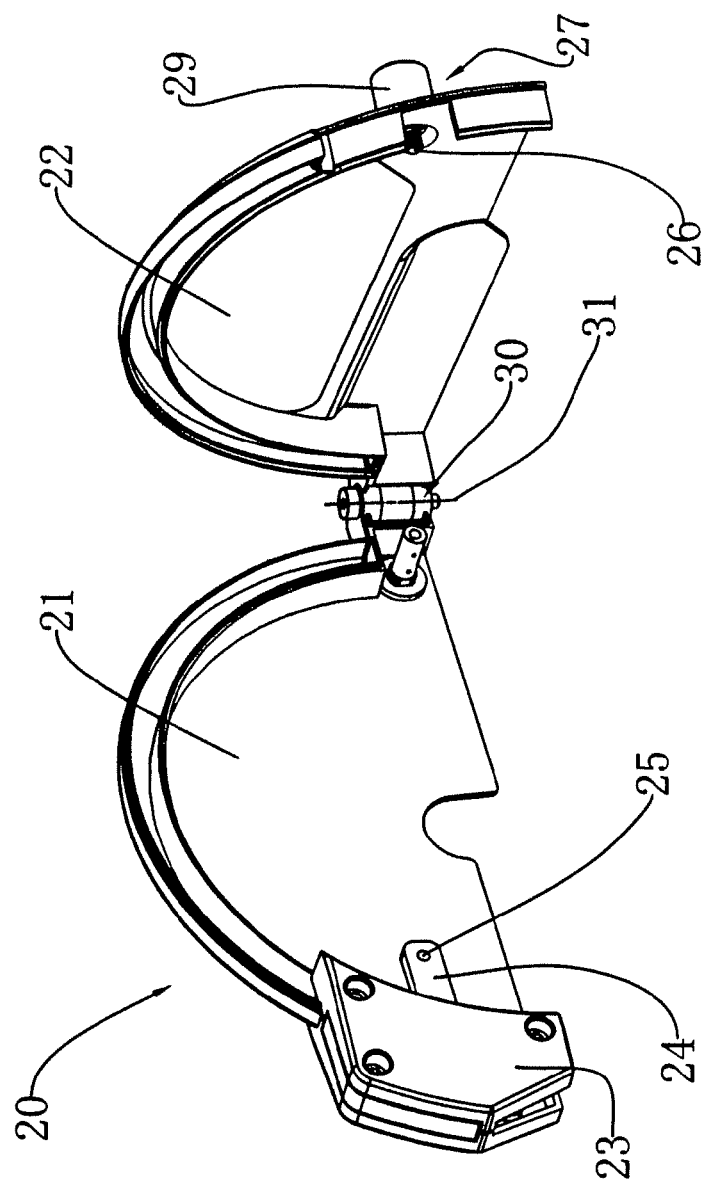
FIG. 2 is a perspective view of the guard assembly in FIG. 1 with the outer guard portion opened.
Figure 3:
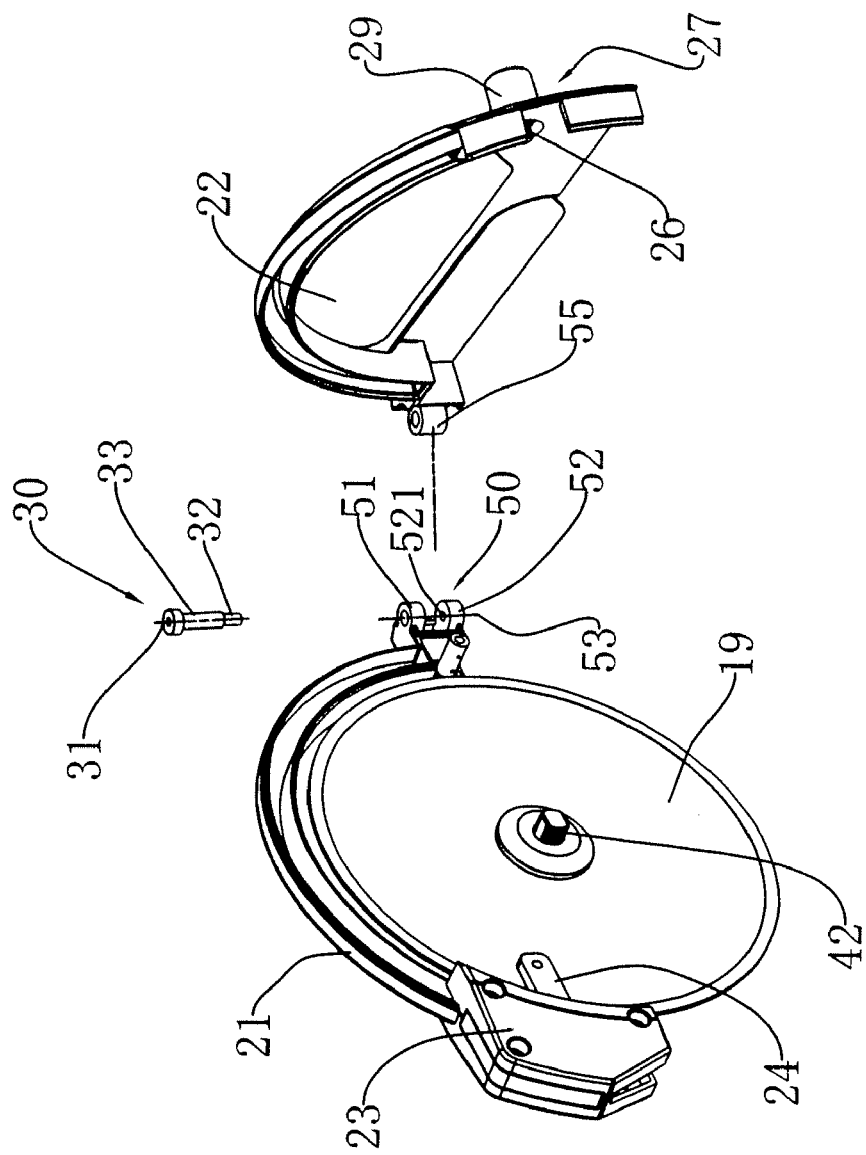
FIG. 3 is another perspective view of the guard assembly in FIG. 1 with the outer guard portion opened.

FIGS. 2 and 3 are perspective views of the guard assembly 20 for the saw blade 19 in the opened state. As shown in the figures, the guard assembly 20 comprises an inner guard portion 21 and an outer guard portion 22 which define a containing space therebetween when fixed to each other. At least a portion of the saw blade 19 is contained in the space. The saw blade 19 has two parallel sides and a rotating axis 42 which is perpendicular to the two sides. A laser device 23 is fixed at one end of the inner guard portion 21. The laser device 23 comprises a fixing plate 24 extending inwardly from the peripheral edge of the inner guard portion 21. The fixing plate 24 comprises an inner threaded hole 25. A fixing device 27 is mounted on the outer guard portion 22, which comprises a screw 26 and a knob 29. When the inner and outer guard portions 21, 22 are closed, the screw 26 can be screwed into the inner threaded hole 25 by rotating the knob 29, thus the two guard portions are locked together.

The guard assembly 20 further comprises connecting means, through which the outer guard portion 22 can be pivotally connected to the inner guard portion 21. The connecting means includes a first connecting member 30, which comprises a first portion 32 and a second portion 33. In the present preferred embodiment, the first portion 32 is a threaded rod, and the second portion 33 is a cylinder. The first and the second portion 32, 33 are coaxial and have a same central axis 31. A protruding member 50 is mounted at the other end of the inner guard portion 21. The protruding member 50 comprises a first sleeve 51 and a second sleeve 52. The first sleeve 51 is formed with a cylindrical through hole for receiving the second portion 33 of the first connection member 30. The second sleeve 52 is formed with a threaded hole 521 for engaging with the first portion 32 of the first connecting member 30, such that the first connecting member 30 is fixedly mounted to the inner guard portion 21. Correspondingly, the cylindrical through hole of the first sleeve 51 and the threaded hole of the second sleeve 52 are coaxial and have a same central axis 53. The outer guard portion 22 comprises a second protruding member 55. In the present embodiment, the second protruding member 55 is a sleeve with a cylindrical hole which receives therein the second portion 33 of the first connecting member 30, such that the outer guard portion 22 is pivotally connected to the inner guard portion through the first connecting member 30 connected therebetween. Those skilled in the art may easily recognize that the connecting means may have other shapes and configurations, and the positions of the two connecting members on the guard portions may be interchanged. The first and the second protruding members may be integrated with the inner guard portion or the outer guard portion respectively, or may be separately installed.

During operation of the saw blade 19, the inner and the outer guard portion 21, 22 are fixed together through the fixing device 27. When it is needed to open the guard assembly 20 to change the saw blade 19 or clean the guard assembly 20, the knob 29 can be rotated to unscrew the screw 26 from the threaded hole 25, then the outer guard portion 22 can be laterally pivoted about the axis 31 to completely expose the saw blade 19, which facilitates changing the saw blade 19 or cleaning the inner side of the guard assembly 20. The pivot axis 31 is substantially parallel to each side of the blade 19.

The present invention is not restricted as the embodiments disclosed hereinabove which just indicate the conceptive and principle of the present invention. Other embodiments in variations to the preferred embodiment will be apparent to those skilled in the art and may be made without departing from the spirit and scope of the present invention as defined in the appended claims.

What is claimed is:

1. A guard assembly for use with a circular saw blade, comprising: a semicircular inner guard and a semicircular outer guard defining a space therebetween for receiving a portion of a circular saw blade, the saw blade having two parallel sides and an outer edge defining an outer boundary of the saw blade, and the semicircular inner guard having a lower portion with an arcuate opening for receiving a rotating axis of the saw blade; wherein the outer guard portion is pivotably mounted to the inner guard portion about a pivotal axis substantially parallel to each side of the saw blade, wherein the outer guard portion can be pivotally moved from the inner guard portion to expose the saw blade; a fixing device for fastening the outer guard to the inner guard, wherein the fixing device comprises a knob coupled to a screw extending from an inner surface of one of the inner and outer guard and a fixing plate disposed on an inner surface of the other of the inner and outer guard with a corresponding threaded hole therein for receiving the screw, the fixing plate being positioned on the side of the saw blade facing away from the one of the inner guard and the outer guard having the fixing plate, wherein the threaded hole receives the screw at a location outside the outer boundary of the saw blade; a connecting means, wherein the connecting means is located along the curvilinear periphery of one of the semicircular inner guard and semicircular outer guard, wherein the connecting means comprises a first connecting member having a first threaded portion and a second cylindrical portion, and wherein the connecting means further comprises a protruding member, wherein the protruding member is disposed on one of the inner guard and the outer guard, the protruding member including a first sleeve and a second sleeve for receiving at least a portion of the first connecting member; and wherein the connecting means further comprises a second protruding member disposed on the other of the inner guard and the outer guard, and at least a portion of the second protruding member including an aperture for rotatably receiving the second portion of the first connecting member.

2. A guard assembly for use with a circular saw blade, comprising:
   a semicircular inner guard and a semicircular outer guard defining a space therebetween for receiving a portion of a circular saw blade, the semicircular inner guard having a lower portion with an arcuate opening for receiving a rotating axis of the saw blade, the saw blade having two parallel sides and an outer edge defining an outer boundary of the saw blade;
   wherein the outer guard portion is pivotably mounted to the inner guard portion about a pivotal axis substantially parallel to each side of the saw blade, wherein the outer guard portion can be pivotally moved from the inner guard portion to expose the saw blade; and,
   a fixing device for fastening the outer guard to the inner guard, wherein the fixing device comprises a knob coupled to a screw extending from an inner surface of one of the inner and outer guard and a fixing plate disposed on an inner surface internal to the guard cavity of the other of the inner and outer guard with a corresponding threaded hole therein for receiving the screw, the fixing plate being positioned on the side of the saw blade facing away from the one of the inner guard and the outer guard having the fixing plate, wherein the threaded hole receives the screw at a location outside the outer boundary of the saw blade; and,
   a connecting means, wherein the outer guard is pivotably mounted to the inner guard portion, the connecting means comprising a first protruding member, wherein the first protruding member is disposed on one of the inner guard and the outer guard, the first protruding member including a first sleeve and a second sleeve for receiving at least a portion of a first connecting member, and wherein the connecting means further comprises a second protruding member disposed on the other of the inner guard and the outer guard, the second protruding member including a third sleeve for receiving at least a portion of the first connecting member.

* * * * *